United States Patent [19]

Dale

[11] 4,440,970

[45] Apr. 3, 1984

[54] VERTICALLY ALIGNED GAS-INSULATED TRANSMISSION LINE HAVING PARTICLE TRAPS AT THE INNER CONDUCTOR

[75] Inventor: Steinar J. Dale, Monroeville, Pa.

[73] Assignee: The United States of America as represented by the United States Department of Energy, Washington, D.C.

[21] Appl. No.: 356,686

[22] Filed: Mar. 10, 1982

[51] Int. Cl.³ .................... H01B 9/06; H01B 9/04; H02G 5/06
[52] U.S. Cl. .................................. 174/14 R; 174/28; 174/100
[58] Field of Search ............... 174/14 R, 16 B, 22 C, 174/27, 28, 99 R, 99 B, 99 E, 100

[56] References Cited

U.S. PATENT DOCUMENTS

| | | | |
|---|---|---|---|
| 3,814,879 | 6/1974 | Cookson et al. | 174/14 R X |
| 3,856,978 | 12/1974 | Sletten et al. | 174/14 R |
| 4,096,345 | 6/1978 | Kemeny | 174/14 R |
| 4,281,209 | 7/1981 | Yoshioka et al. | 174/14 R |
| 4,370,511 | 1/1983 | Cookson et al. | 174/14 R |

FOREIGN PATENT DOCUMENTS

| | | | |
|---|---|---|---|
| 50-138384 | 11/1975 | Japan | 174/14 R |
| 547024 | 3/1974 | Switzerland | 174/14 R |
| 544034 | 4/1977 | U.S.S.R. | 174/14 R |

*Primary Examiner*—Laramie E. Askin
*Attorney, Agent, or Firm*—M. S. Yatsko

[57] ABSTRACT

Gas insulated electrical apparatus having first and second conductors separated by an insulating support within an insulating gas environment, and particle traps disposed along the surface of the high potential conductor for trapping and inactivating foreign particles which may be present within the insulating gas medium. Several embodiments of the invention were developed which are particularly suited for vertically aligned gas insulated transmission lines. The particle traps are grooves or cavities formed into the walls of the tubular inner conductor, without extending into the hollow portion of the conductor. In other embodiments, the traps are appendages or insert flanges extending from the inner conductor, with the insulator supports contacting the appendages instead of the inner conductor.

6 Claims, 7 Drawing Figures

VERTICALLY ALIGNED GAS-INSULATED TRANSMISSION LINE HAVING PARTICLE TRAPS AT THE INNER CONDUCTOR

GOVERNMENT RIGHTS STATEMENT

The Government has rights in this invention pursuant to Contract No. ET-78-E-01-3029 awarded by the U.S. Department of Energy.

BACKGROUND OF THE INVENTION

1. Field of the Invention

The invention relates in general to gas-insulated electrical equipment and more particularly to gas-insulated electrical equipment having particle trapping means disposed along the high potential conductors.

2. Description of the Prior Art

It is known to provide particle traps in low field regions of compressed gas-insulated transmission lines where conducting or semiconducting particles may be trapped and inactivated. The lower field region in gas-insulated transmission lines is located along the outer sheath or outer elongated cylindrical conductor. It has been common practice, therefore, in the prior art to install the particle traps along the surface of the outer sheath. In horizontally disposed transmission lines the particle traps are installed at the bottom of the outer sheath, where gravity and the electric field eventually force these conducting or semiconducting particles into the particle trap. In vertically disposed transmission lines it has been the practice in the prior art to again locate the particle trap along the vertical oriented outer sheath, with a conical deflecting shield having an apex end section located higher than a base end section, to provide a path so that again the forces of gravity act upon the loose particles to propel them along the conical surface until such time as the particle is adjacent the outer sheath where it is deactivated in a particle trap. However, it is often unavoidable in bushings and circuit breakers as well as gas-insulated substations and vertical compressed gas-insulated transmission lines to design an epoxy cone-mounted insulator with the apex pointed downward wherein the forces of gravity would urge falling particles away from the outer sheath towards the central conductor in the region of high electric field. Also, the electric field present between the outer and inner conductors may, under the influence of the electric field, cause particles to be propelled towards the inner conductor as, but not limited to, along the surface of an insulator. Accordingly, it would be desirable to provide some means for trapping the particles which may be present near the surface of the inner conductor before they would precipitate electrical breakdown across the electrical transmission line or other electric apparatus.

SUMMARY OF THE INVENTION

Briefly, the present invention is a transmission line including an outer conductor, an inner conductor adapted for connection to a high potential external energizing source, means for insulatedly supporting the inner conductor within the outer conductor, and particle trapping means disposed along the surface of the inner conductor. Alternate embodiments of the invention include several structural variations along the surface of the inner conductor to provide the particle trapping means such as a cavity within the inner conductor wall or a concave-shaped flange or appendage disposed along and in electrical contact with the surface of the inner conductor. In accordance with the invention the support means for insulatedly supporting the inner conductor within the outer conductor may comprise a conventional cone-shaped epoxy insulator, mounted with the apex pointed upwards or downwards, proximate with, and preferably covering, an edge of the particle trapping means, wherein particles are captured before reaching the high field at the conductor which can cause flashover. One embodiment of the invention includes a particle trapping means disposed on both sides of the apex of the insulator where the inner conductor extends through a bore thereof, permitting the gas-insulated transmission line to be installed with the conical insulator turned either up or down, while still maintaining a particle trapping means along the inner conductor at the preferred location proximate the apex of the insulator. When the apex of the insulator is pointed downward, both the forces of gravity and electric field will urge or propel loose particles into the particle trapping means. When the apex is pointed upward, the force of the electric field must overcome the force of gravity on the particle to urge the foreign particle upwards into the particle trap.

As will be further explained within the description of the preferred embodiment portion of this specification, the invention may comprise any gas-insulated electrical equipment such as transformers, capacitor banks, gas-insulated substations, etc. having a first conductor adapted for connection to a lower potential external source such as ground, a second conductor adapted for connection to a higher potential external energizing source, insulating means for insulatedly separating the first and second conductors, and particle trapping means disposed along the surface of the second conductor. The structural variation of the particle trapping means and insulating support means developed and described herein for the gas-insulated transmission line embodiments of the invention are broadly applicable to all other gas-insulated electrical equipment embodiments of the invention as well.

BRIEF DESCRIPTION OF THE DRAWINGS

The invention may be understood and further advantages and uses thereof more readily appreciated when considered in view of the following detailed description of the exemplary embodiments, taken with the accompanying drawings, in which.

DESCRIPTION OF THE PREFERRED EMBODIMENTS

Figure 1:
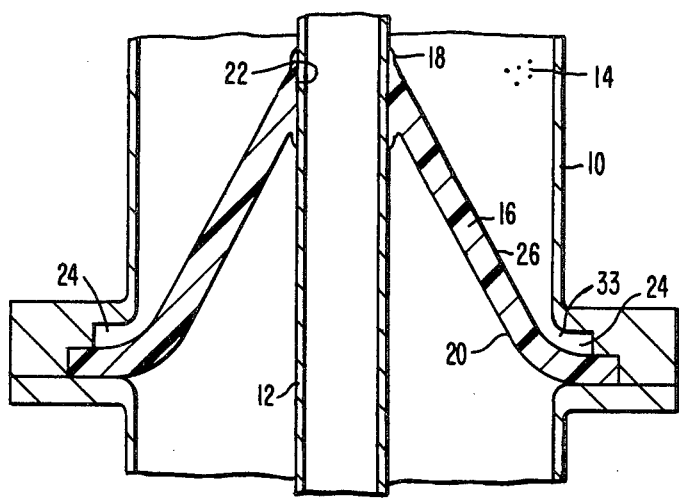
FIG. 1 is an elevational sectional view of a vertically aligned compressed gas-insulated transmission line of the prior art showing a conical insulator or deflecting shield mounted so as to deflect particles into a particle trap located at the outer sheath.

Referring now to the drawings and to FIG. 1 in particular there is shown in elevation, a sectional view illustrating a gas-insulated transmission line of the prior art having a conical insulator and a particle trap at the location where the insulator is secured to the outer sheath. More particularly, the gas-insulated transmission line of the prior art generally includes an elongated, cylindrical outer sheath 10, an elongated cylindrical inner conductor 12 disposed within the outer sheath 10, and an insulating gas 14 typical of which is sulfur hexafluoride which is disposed within the outer sheath 10 and electrically insulates the outer sheath 10 from the inner conductor 12. The typical gas-insulated transmission line has the outer sheath 10 at ground or low potential, and the inner conductor 12 at high electrical potential, voltages typical of which are 121 kV to 800 kV. Supporting and positioning the inner conductor 12 within the outer sheath 10 are typically a plurality of support insulators 16, one of which is shown in FIG. 1. Support insulator 16 is of generally conical shape having an apex end section 18 and a base end section 20. Apex end section 18 has an opening 22 therethrough, with inner conductor 12 extending through the centrally disposed opening 22, and conical support insulator 16 extends outwardly to the outer sheath 10 wherein base end section 20 is secured to the outer sheath 10 at the location of particle trapping means 24. As illustrated, these particle trapping means 24 comprise an extension of the outer sheath 10 which extends radially outward beyond the remainder of the outer sheath 10 to thereby provide a slot 33 which has a lowered field intensity, as described in the patent to Trump, U.S. Pat. No. 3,515,939, which is hereby referred to and herein incorporated by reference. Particles of foreign matter, which may be present within the transmission line, are urged downward due to the force of gravity and deflected to the inner conductor or the outer sheath due to the force of the electrical field (providing the particle has a compatible induced charge), which particles may fall along the insulator surface 26, and have an increased probability of coming to rest within particle trapping means 24 to thereby inactivate the particles. In this instance, because the particles would be trapped in a much lower field region, the likelihood of the particle initiating a breakdown across the support insulator 16 is greatly minimized.

Some particles of foreign matter, depending upon their original location within gas-insulated transmission lines before they break away to begin their path of travel, such as during an unusual voltage surge on the inner conductor, may have a charge induced upon them by the electric field within the transmission line which causes them to be attracted toward the inner conductor. These particles would then enter high electric field regions near the inner conductor and have a much greater propensity to result in flashover, in particular during over-voltage conditions such as lightning and switching impulses. As well known in the art, this adversely affects the breakdown voltage of the dielectric gas and consequently the breakdown voltage of the transmission line. Also, since the electric field is changing with the frequency of the electrical energy the transmission line is carrying, the movement of all foreign particles within the dielectric gas may be characterized as random with a high probability of some foreign particles being urged to both the inner conductor and the outer sheath. Also, it is not always possible to mount the conically shaped support insulators with the apex pointed upward as shown in FIG. 1. Often a design unavoidable in bushings and circuit breakers as well as in gas-insulated substations and vertical compressed gas-insulated transmission lines dictates that the cone-shaped support insulator be mounted with the apex pointed downward, which then marshalls the forces of gravity to propel any falling foreign particles towards the high electric field region of the inner conductor. In order to defeat the problems inherent with the presence of these foreign particles near the inner conductor, the particle trap means according to the present invention was developed.

Figure 3:
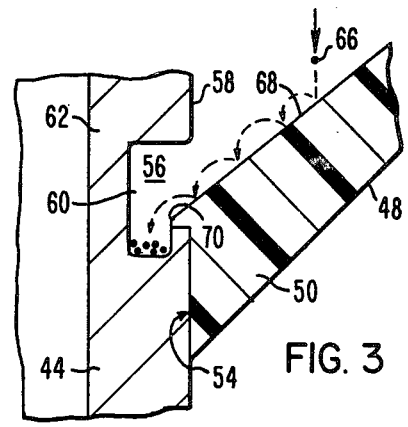
FIG. 3 is an enlarged view of a portion of FIG. 2, as indicated by circle A in FIG. 2, showing the particle trapping means and a portion of the insulator with a particle being deflected into the particle trap means.
Figure 2:
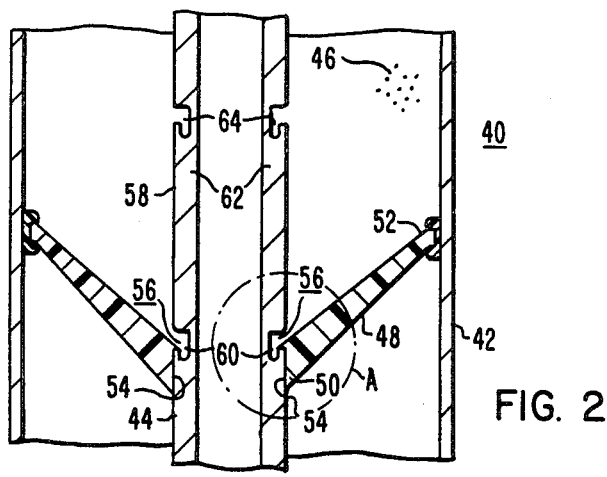
FIG. 2 is an elevational sectional view of a vertically aligned gas-insulated transmission line constructed according to the teachings of the invention showing a conical epoxy insulator with the apex pointed downward having an inner conductor disposed in a bore therethrough and a cavity-type particle trapping means disposed along the surface of the inner conductor proximate the location of the apex of the insulator with a portion of the insulator covering the top edge of the cavity wall.

Referring now to FIG. 2, there is shown a gas-insulated transmission line constructed according to the teachings of the present invention. More particularly, gas-insulated transmission line 40 includes an elongated, cylindrical outer sheath 42, an elongated cylindrical inner conductor 44, which may be cast aluminum, disposed within the outer sheath 42, and an insulating gas 46 typical of which is sulfur hexafluoride which is disposed within the outer sheath 42 and electrically insulates the outer sheath 42 from the inner conductor 44. Support insulator 48, which may be formed of cast epoxy, is of a generally conical shape, having an apex end section 50 and a base end section 52, with an opening 54 centrally disposed through apex end section 50. Now, however, apex end section 50 is disposed downward with base end section 52 disposed vertically higher than the apex end section 50 of support insulator 48. Conical-shaped support insulator 48 is of a design that is often unavoidable in vertical compressed gas-insulated transmission line systems as well as gas insulated substations, circuit breakers and other electrical equipment. Particle trapping means 56 is disposed within surface 58 of inner conductor 44 and consists of cavity 60 in the conductor wall 62 at the support insulator apex end portion 50-inner conductor 44 junction. Area A of FIG. 2 is shown in an enlarged view in FIG. 3 to better show the support insulator-conductor junction with particle trapping means disposed therein. Referring now to FIG. 3 there is shown a typical foreign particle 66 moving (under the influence of the gravitational and electrical fields present) down the cone-shaped insulator surface 68 towards the inner conductor 44 to enter the zero field cavity 60 of particle trapping means 56 and be harmlessly trapped therein. Cavity 60 of particle trapping means 56 experiences a zero field or near zero field conditions because the high electric field near the inner conductor surface 58 of inner conductor 44 is shielded by conductor wall 62 to thereby provide cavity 60 with a greatly lowered field intensity, approaching zero, as further described in the above-referenced Trump patent. The electric field near the junction of inner conductor 44 and support insulator 48 is reduced somewhat by the presence of insulator 48 at the entrance to the particle trapping means 56 so that the likelihood of the particle initiating a breakdown across support insulator 48 on its journey into cavity 60 is greatly minimized. The establishment of a zero or near zero greatly lowered field intensity within cavity 60 reduces the likelihood of a particle being lifted out of such a region during an unusual voltage surge on the inner conductor 44, during which temporary condition higher-than-normal electric fields may exist, which may cause movement of insufficiently well-trapped particles back into the insulated region between inner conductor 44 and the outer sheath 42. An adhesive material such as that sold under the trademark "Pliobond" by the Goodyear Corporation can be applied in the bottom of the cavity to improve the retention of the particles inside cavity 60.

If particle trapping means cavity 60 were not present, foreign particles would collect at the low point between inner conductor 44 and support insulator 48. This condition would result in flashover, in particular under voltage conditions such as lightning and switching impulses. The epoxy or other material from which support insulator 48 is manufactured should also cover the top edge of the cavity wall as shown at 70 in FIG. 3 to prevent particles from contacting the metal inner conductor 44 at this region of high electric stress (the interface between inner conductor 44 and support insulator 48) before it falls into the low field cavity.

Referring again now to FIG. 2 there is shown a particle trapping means cavity 64 disposed within inner conductor wall 62 at a location not coincident with the convergence of a support insulator such as support insulator 48 (or a thin flexible deflector shield of low dielectric constant material which may be employed in lieu of a support insulator). From this it is to be understood that it is not necessary for the particle trapping means to be located at the junction of a support insulator (or other deflector shield) and the inner conductor, but rather may be located anywhere along the inner conductor where it would be desirable to trap foreign particles which are attracted by the high electric fields present at the inner conductor. Particle trapping means cavities such as cavities 60 and 64, respectively, may be made by casting, machining, peening or otherwise forming within the inner conductor wall 62. The cavities such as cavities 60 and 64, respectively, should be circumferential for ease of manufacturing and also to provide full 360-degree particle trap means protection.

Figure 4:
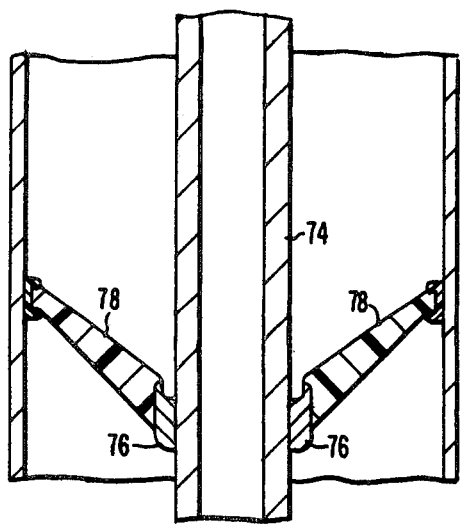
FIG. 4 is an alternate embodiment of a particle trapping means according to the teachings of the invention.
Figure 5:
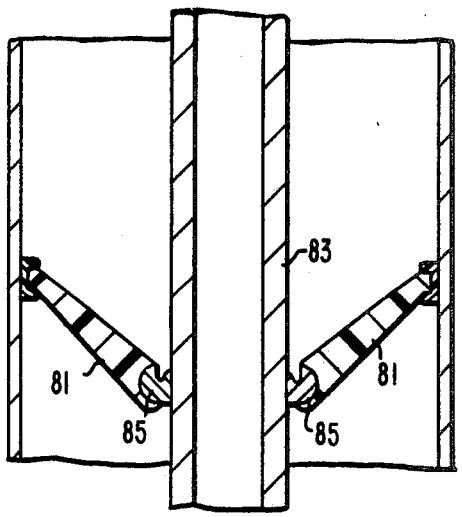
FIG. 5 is another alternate embodiment of a particle trapping means according to the teachings of the invention.

Other embodiments of the invention wherein a metallic cavity is formed along the surface 58 of inner conductor 44 are shown in FIGS. 4 and 5. In FIG. 4 is shown a complete cast inner conductor 74 having a cast cavity forming concave insert flange 76 which may then be molded into the conical support insulator 78. In FIG. 5 there is shown an embodiment of the invention wherein an appendage concave cavity 85 is formed by an insert cast into epoxy insulator 81 and then welded to the inner conductor 83. Other methods of forming and securing cavity forming insert 76 and appendage cavity 85 may also be used.

Figure 6:
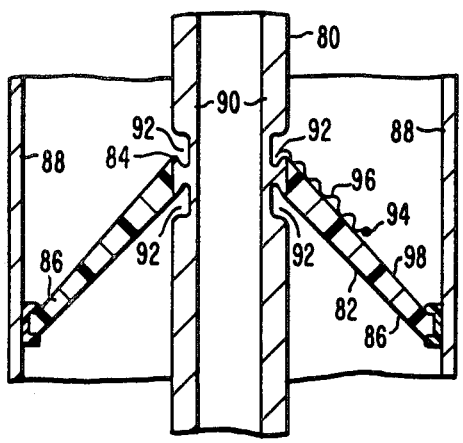
FIG. 6 is a gas-insulated transmission line constructed according to the teachings of the invention showing a conical-shaped insulator having the inner conductor disposed through a bore in the apex thereof with the inner conductor having two cavity-type particle trapping means located on either side of junction of the apex of the insulator with the inner conductor allowing the transmission line to be oriented such that the apex of the insulator may be turned either up or down while still maintaining a cavity particle trap at the preferred location.

Particles may also move against the gravitational field up an incline particularly if the electric field is increasing in this direction as in a coaxial system with the apex of a conical insulator pointing upwards. With this in mind, an embodiment of the invention shown in FIG. 6 including an inner conductor 80 and a conical support insulator 82 with the apex of conical support insulator 82 pointing upwards, that is, apex 84 of conical support insulator 82 is disposed vertically higher than base end section 86, which is secured to outer sheath or elongated conductor 88. In this embodiment of the invention the particle trapping means is disposed within inner conductor wall 90 at the junction of inner conductor 80 with each side of conical support insulator 82. More specifically as shown in FIG. 6, particle trapping means cavities 92 are disposed on either side of support insulator 82. The same pinciple as hereinbefore described of a cavity disposed within the conductor 80 or a cavity appendage disposed on the surface of conductor 80 can be employed. Again the particles are captured in the cavity instead of at the high field at the conductor which can cause flashover. This is exemplified by a foreign particle shown generally at 94 moving in a random movement shown by line 96 up the inclined surface 98 of conical support insulator 82 to rest within particle trapping means cavity 92. Note that particle 94 moves against the force of gravity due to the more powerful force of the electric field as hereinbefore described. The embodiment of the invention shown in FIG. 6, with particle trapping means cavities disposed on both sides of the insulator attachment within conductor 80, provides that the gas-insulated transmission line can be turned 180 degrees, that is, conical support insulator 82 can be turned with the apex either up or down while still maintaining a cavity particle trap at the preferred location near the insulator/deflecting shield apex.

In conclusion, there has been disclosed herein particle trapping means disposed on the inner conductor to provide for a means of eliminating those foreign particles which may gravitate, be propelled by the electric field or otherwise be attracted to the high potential inner conductor within the associated high electrical field area surrounding the inner conductor. Although the preferred embodiments of the invention hereinabove described were developed for gas-insulated transmission lines, because the invention solved certain problems inherent therewith, the invention is not limited thereto but rather is broadly applicable to any electrical equipment having a high potential 1st conductor separated from a lower potential 2nd conductor by insulating means.

Figure 7:
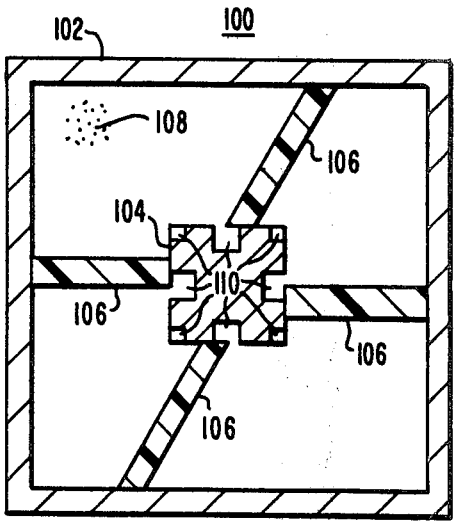
FIG. 7 is a schematic view of gas-insulated electrical equipment constructed according to the teachings of the invention showing in block diagram form how the teachings of the invention may be applied to any gas-insulated electrical equipment.

An embodiment of the invention applied in general to any gas insulated electrical equipment is exemplified in schematic form in FIG. 7. Referring now to FIG. 7 there is shown gas-insulated electrical equipment 100 including a first or outer conductor 102, a second or inner conductor 104 which may be energized to a high potential, insulating support means 106 for supporting high potential inner conductor 104 within outer conductor 102, insulating gas 108 disposed within outer conductor 102, and particle trapping means 110 disposed along the surface of inner conductor 104. Particle trapping means 110 is for trapping any foreign particles which may be within the space between outer and inner conductors 102 and 104, respectively. All of the elements 100 through 110 in FIG. 7 are shown generally in block diagram form so as to further exemplify the broad teachings of the present invention, which blocks represent outer conductors, inner conductors, insulating gas, insulating support means, and particle trapping means that may represent elements within gas-insulated transformers, gas-insulated substations, gas-insulated transmission lines, gas-insulated reactors or any other gas-insulated electrical equipment in which it is desired to eliminate the problems caused by loose foreign particles within the gas-insulating medium which may be attracted to the high potential conductor. Note that 1st and 2nd conductors 102, 104 respectively need not even represent outer and inner conductors as described for FIG. 7, but rather may be any two conductors at differing potentials which are separated within a gas insulating medium. The particle trap cavities, flanges, inserts and appendages may be formed along the surface of the 2nd or inner conductor (the conductor at high potential) by means of casting them during the casting of the 2nd or inner conductor, machining, welding or otherwise securing them mechanically and electrically to the surface of the inner conductor as hereinbefore described with regard to gas insulated transmission lines.

What is claimed is:

1. A gas-insulated transmission line, comprising:
   an outer conductor;
   a tubular inner conductor adapted for connection to an external energizing source disposed interiorly within said outer conductor, said tubular inner conductor having a wall thickness and a hollow interior;
   an insulating gas disposed within the space between said outer and inner conductors;
   support means for insulatably supporting said inner conductor within said outer conductor; and
   particle trapping means for trapping foreign particles disposed along said inner conductor, said particle trapping means comprising said inner conductor wall having a circumferentially disposed cavity formed therein open facing said outer conductor, said cavity extending radially inwardly a distance less than the wall thickness of said inner conductor such that said cavity and the hollow interior of said inner conductor are separated by a portion of said inner conductor wall.

2. The gas-insulated transmission line of claim 1 wherein the support means includes an elongated conical-shaped insulator having an apex end section having a bore therethrough and a base end section extending radially outward to and contacting said outer conductor, said inner conductor extending through said bore, said circumferentially disposed cavity being located proximate said apex end section of said elongated conical-shaped insulator.

3. The gas-insulated transmission line of claim 2 wherein said gas-insulated transmission line is aligned vertically and said base end section of the insulator is vertically lower than the apex end section of said insulator.

4. The gas-insulated transmission line of claim 2 wherein said gas-insulated transmission line is aligned vertically and said base end section of the insulator is vertically higher than the apex end section of said insulator.

5. The gas-insulated transmission line of claim 3 or 4 including a second circumferentially disposed cavity disposed in the inner conductor wall, said cavities being located on opposite sides of the apex end section of the insulator.

6. The gas-insulated transmission line of claim 5 wherein the insulator is made from an epoxy material which is cast around the inner conductor.

* * * * *